United States Patent [19]

Saito et al.

[11] Patent Number: 4,950,330

[45] Date of Patent: Aug. 21, 1990

[54] AQUEOUS DISPERSION OF A DEVELOPER FOR PRESSURE-SENSITIVE RECORDING SHEET AND A PROCESS FOR PRODUCING THE SAME

[75] Inventors: Toranosuke Saito; Shouichi Murata; Eiji Kawabata, all of Osaka; Tomoharu Shiozaki; Tetsuo Shiraishi, both of Hyogo, all of Japan

[73] Assignees: Sanko Kaihatsu Kagaku Kenkyusho, Osaka; Kanzaki Paper Manufacturing Co., Ltd., Tokyo, both of Japan

[21] Appl. No.: 405,063

[22] Filed: Sep. 7, 1989

Related U.S. Application Data

[63] Continuation of Ser. No. 143,361, Jan. 12, 1988, abandoned.

[30] Foreign Application Priority Data

Jan. 14, 1987 [JP] Japan .................................. 62-5129
Jul. 30, 1987 [JP] Japan .................................. 62-188930

[51] Int. Cl.[5] .................................. C09D 11/00

[52] U.S. Cl. .................................. 106/21; 503/216; 503/219

[58] Field of Search .................. 106/21; 503/216, 219

[56] References Cited

U.S. PATENT DOCUMENTS

| | | | |
|---|---|---|---|
| 4,121,013 | 10/1978 | Miller et al. | 106/21 |
| 4,219,219 | 8/1980 | Sato et al. | 106/21 |
| 4,239,815 | 12/1980 | Kato et al. | 427/150 |
| 4,374,671 | 2/1983 | Hayashi et al. | 106/21 |
| 4,531,139 | 7/1985 | Seitz | 503/216 |
| 4,620,874 | 11/1986 | Booth, Jr. et al. | 106/21 |
| 4,688,058 | 8/1987 | Ikeda et al. | 503/216 |

FOREIGN PATENT DOCUMENTS

| | | |
|---|---|---|
| 56-33985 | 4/1981 | Japan . |
| 56-33987 | 4/1981 | Japan . |
| 56-25493 | 11/1981 | Japan . |
| 38118 | 8/1983 | Japan . |
| 2150165 | 6/1985 | United Kingdom . |

*Primary Examiner*—A. Lionel Clingman
*Assistant Examiner*—Willie J. Thompson
*Attorney, Agent, or Firm*—Kane, Dalsimer, Sullivan, Kurucz, Levy, Eisele and Richard

[57] ABSTRACT

An aqueous dispersion of a developer for pressure-sensitive recording sheet, having superior handling performance and storage stability in a high concentration and a process for producing the dispersion are provided, which developer is expressed by the formula

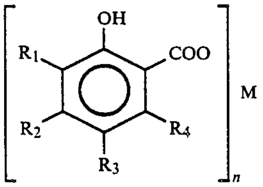

(I)

wherein $R_1$, $R_2$, $R_3$ and $R_4$ may be the same or different and represent H, halogen, alkyl of 1 to 9 carbon atoms, alkylene, cycloalkyl, cycloalkylene, phenyl, nucleus-substituted phenyl, aralkyl or nucleus-aralkyl; adjacent two of $R_1$ to $R_4$ may form a ring; n is an integer of one or more; and M is Mg, Ca, Zn, Al, Fe, Co, Ni or a basic ion of the foregoing, and which developer has a softening point of 30° C. or higher and is dispersed in water, containing a dispersing agent, the size of particles of the developer being 0.3 to 5μ in terms of average particle diameter, and the proportion of right spherical particles in the total particles being 50% or more; and which process comprises emulsifying-dispersing the developer in water containing a dispersing agent at a temperature higher by at least 30° C. than the softening point of the developer, follower by cooling, or dissolving the developer in an organic solvent, emulsifying-dispersing the solution in water containing a dispersing agent and distilling off the solvent from the dispersion on heating, or using a polyvinyl alcohol having a polymerization degree of 500 or more and a saponification degree of 70% or more.

16 Claims, No Drawings

AQUEOUS DISPERSION OF A DEVELOPER FOR PRESSURE-SENSITIVE RECORDING SHEET AND A PROCESS FOR PRODUCING THE SAME

This is a continuation of co-pending application Ser. No. 143,361 filed on Jan. 12, 1988, now abandoned.

BACKGROUND OF THE INVENTION

1. Field of the Invention

This invention relates to an aqueous dispersion of a developer for pressure-sensitive recording sheet having improved handling performance and storage stability in a high concentration thereof and a process for producing the same.

2. Description of the Related Art

Novolak type phenolic resins and metal salts of substituted salicylic acids have been referred to as organic developer instead of inorganic developer such a activated clay, etc., and broadly practically used (Japanese patent publications No. Sho 42-20144/1976 and No. Sho 51-25174/76). Further, these developers have usually been finely ground or finely dispersed using water as a medium, followed by blending inorganic carrying base pigment, adhesive, etc. with the resulting material and then coating the blend onto the surface of paper (Japanese patent publication No. Sho 48-16341/1973, and Japanese patent application laid-open No. Sho 54-143322/1979).

Now, metal salts of substituted salicylic acids used as a developer for pressure-sensitive recording sheet consist usually of non-crystalline solids. Since this developer is generally dispersed in water and coated onto the surface of paper, it is most desired to feed it in the form of a dispersion which is concentrated and superior in the handling performance and stability. However, if coarse particles of this developer are finely ground in water containing a dispersing agent by means of ball mill, sand grinder or the like, up to a size to such an extent that the resulting dispersion is preferred to be coated, the dispersion becomes notably thixotropic, resulting only in a state where it is poor in the fluidity and difficult in the handling. Thus, if it is intended to make the dispersion fluid much or less, it is necessary to reduce the concentration of the developer in the dispersion or to use the developer in a large quantity to such an extent that notable bubbling occurs, but such means are undesirable. On the other hand, if this developer is dissolved in an organic solvent and the resulting solution is dispersed in an aqueous solution containing a dispersing agent by means of a powerful agitating means, an emsulfied dispersion having a good fluidity even in a high concentration is obtained, but since the resulting dispersed particles are in the form of droplets containing the organic solvent, there occur such phenomena that the particle size increases during a long term storage or the emulsion is broken in the vicinity of the wall of the vessel; hence it is deficient in the stability.

SUMMARY OF THE INVENTION

An object of the present invention is to provide an aqueous dispersion of a developer for pressure-sensitive recording sheet having superior handling performance and storage stability in a high concentration thereof, and a process for producing the same.

Another object of the present invention is to provide a process for producing an aqueous dispersion of a developer having superior handling performance and storage stability and yet capable of notably improving the color-developing properties, printability and light-resistance of a developer sheet for pressure-sensitive recording sheet.

The present invention in the first aspect resides in an aqueous dispersion of a developer for pressure-sensitive recording sheet, which developer is composed mainly of a salt of substituted salicylic acids expressed by the formula (I)

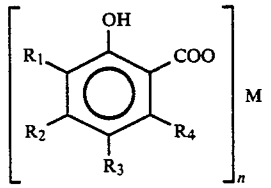

(I)

wherein $R_1$, $R_2$, $R_3$ and $R_4$ may be the same or different and each represent hydrogen atom, halogen atom, alkyl group of 1 to 9 carbon atoms, alkylene group, cycloalkyl group, cycloalkylene group, phenyl group, nucleus-substituted phenyl group, aralkyl group or nucleus-substituted aralkyl group; adjacent two of $R_1$, $R_2$, $R_3$ and $R_4$ may form a ring in combination thereof; and in the case where one or more of $R_1$, $R_2$, $R_3$ and $R_4$ are alkylene group, nucleus-substituted aralkyl group or cycloalkylene group, two or more salicylic acid skeletons may be contained in one molecule; n represents an integer of one or more, preferably 1 to 3; and M represents magnesium, calcium. zinc, aluminum, iron, cobalt, nickel or a basic ion of the foregoing, and which developer has a softening point of 30° C. or higher and is dispersed in water, the size of the particles of the developer being in the range of an average particle diameter of 0.3 to 5μ, and the proportion of right spherical particles in the total particles of the developer being 50% or more.

The softening point referred to herein means a softening temperature in a state where the developer contains an equilibrium moisture in water, and it is usually lower by about 50° C. than the softening point of the developer in dried state. Further, the right sphere referred to herein means a state where the droplet of the developer naturally forms a sphere due to the function of its surface tension and is solidified.

The present invention in another aspect resides in a process for producing an aqueous dispersion of a developer for pressure-sensitive recording sheet, which process comprises emulsifying-dispersing a developer composed mainly of a salt of substituted salicylic acids expressed by the above-mentioned formula (I) and having a softening point of 30° C. or higher in water containing a dispersing agent at a temperature higher by at least 30° C, preferably at least 50° C. than the softening point of the developer, followed by cooling.

The emulsifying-dispersing, if necessary, may be carried out with a powerful agitating means. Further, it may also be carried out at a high temperature of 100° C. or higher under pressure.

The present invention in still another aspect resides in a process for producing an aqueous dispersion of a developer for pressure-sensitive recording sheet, which process comprises dissolving a developer composed mainly of a salt of substituted salicylic acids expressed by the above-mentioned formula (I) and having a softening point of 30° C. or higher in an organic solvent, emulsifying-dispersing the resulting solution in water containing a dispersing agent on heating or without heating, and distilling off the organic solvent from the resulting dispersion on heating. If necessary, the distilling-off of the organic solvent may be carried out under reduced pressure.

The present invention in still another aspect resides in a process for producing an aqueous dispersion of a developer for pressure-sensitive recording sheet, which process comprises using a polyvinyl alcohol having a specified polymerization degree and saponification degree as the dispersing agent used in the above-mentioned process to thereby afford a developer sheet having notably improved color-developing properties, printability and light-resistance.

DETAILED DESCRIPTION OF PREFERRED EMBODIMENTS

Fine particles of a developer composed mainly of a salt of salicylic acids have been considered to be intensely charged on the surface thereof. It has also been known that if such intensely charged non-spherical particles are dispersed in water, a structure is formed due to partial unevenness of charge on the particle surface to restrict free movement of particles. As to an aqueous dispersion of such particles, the smaller the particle size, the denser the structure formed so that the resulting dispersion becomes so thixotropic that there is a large tendency of losing its fluidity. In the case of the developer of the present invention, too, if it is finely ground as it is, to a desired particle size, the resulting dispersion almost loses its fluidity. Whereas, the surface charge of right spherical particles is most uniform and in the aggregate thereof, the respective particles nothing but uniformly repulse one another not to obstruct mutual movements of particles; hence the aqueous dispersion has a low viscosity. In fact, when the respective aqueous dispersions of non-spherical particles of the developer and right spherical particles thereof are prepared under the same conditions as those of the present invention except for this condition, surprisingly enough the respective fluidities are notably different.

For preparing a dispersion of a developer composed mainly of a salt of substituted salicylic acids and having a softening point of 30° C. or higher but in the form of non-spherical particles, rough particles of the developer may be finely ground and dispersed in water containing a dispersing agent at a temperature lower by at least about 20° C. than its softening point by means of a grinder such as ball mill or sand grinder. As to the resulting dispersion, even when rough particles are contained therein in a certain quantity, it has an advantage of no deposition thereof, but it has a disadvantage that its fluidity is inferior and particles fuse with one another at a temperature in the vicinity of the softening point thereof and the resulting material solidifies.

Whereas the dispersions of the developer obtained according to two processes of the present invention contain almost only right spherical particles and are abundant in the fluidity even in a content of disperse phase of about 55% by weight. Further, even when they are stored for a long term, the dispersed state is not broken.

Any of the salts of substituted salicylic acids expressed by the formula (I) have a high developability for pressure-sensitive duplicating paper. Representative examples thereof are zinc 3-methyl-5-(α-methylbenzyl)salicylate,
zinc 3,5-di-tertiary-butylsalicylate,
zinc 3-tertiary-butyl-5 phenylsalicylate,
zinc 3,5-di-tertiary-amylsalicylate,
zinc 3,5-dicyclohexylsalicylate,
zinc 3-cyclohexyl-5-(α-methylbenzyl)salicylate,
zinc 3-phenyl-5-(α-methylbenzyl)salicylate,
zinc 3-phenyl-5-(α,α-dimethylbenzyl)salicylate,
zinc 3-(α-methylbenzyl)-5-phenylsalicylate,
zinc 3,5-di(α-methylbenzyl)salicylate,
zinc 3-(α-methylbenzyl)-5-(α,α-dimethylbenzyl)salicylate,
zinc 3-(α-methylbenzyl)-5-bromosalicylate,
zinc 3-(α-methylbenzyl)-4-methylsalicylate,
zinc 3-(α-methylbenzyl)-6-methylsalicylate,
zinc 3-nonyl-5-phenylsalicylate,
zinc 5-(4-mesitylmethylbenzyl)salicylate, zinc pinenized salicylate, zinc 3-hydroxy-2-naphthoate,
zinc 3-hydroxy-7-(α,α-dimethylbenzyl)-2-naphthoate, and salts of substituted salicylates having zinc of these zinc substituted salicylates replaced by Mg, Ca, Al, Fe, Co or Ni. These salts of substituted salicylic acids include those which are singly crystalline, and their softening points are various. In order to prepare developers which are non-crystalline and have a desired softening point, most of them should be adjusted so as to give the objective physical properties, by suitably blending them. If the softening point of the developers is too low, the developers to be coated onto the paper surface and dried infiltrate and are transferred between paper fibers to lose the developing function, and the aqueous dispersion of the developers are also liable to coagulate so that they cannot be said to be sufficiently stable over a long term. On the other hand, even if the softening point of the developers is too high, almost no self-adhesive function is exhibited when they are coated onto the paper surface and dried; hence in order to fix them onto the paper surface, it is necessary to use a large quantity of an adhesive, but in this case, the adhesive forms a film to obstruct transfer of a dye solution contained in microcapsule so that loss of developing function is observed.

For these reasons, the preferred lower limit and upper limit of the range of the softening point of developers are determined. The softening point of the developers is preferably 30° C. or higher, more preferably in the range of 35° to 85° C. As processes for adjusting the softening point of the developers, for example, a first one is to admix developers having different softening points, a second one is to add a substance for lowering the softening point such as metal salts of fatty acids, trialkylphenols, triaralkylphenol, styrene oligomers, etc. to a developer having a too high softening point, and a third one is to add a substance for raising the softening point such as polystyrene, poly-α-methylstyrene, petroleum resin, etc. to a developer having a too low softening point.

The particle size of the developer should be determined judging from the coating properties of the developer onto the paper surface or the color-developing effect thereof. In general, the developer of the present invention is coated only in a proportion of 1 g or less per $m^2$ of the paper surface; hence if the particle size exceeds 5 microns, its distribution on the paper surface becomes uneven at the time of its coating so that drawbacks occur such as default of recorded image, reduction in the developing speed of recorded image in cold districts, etc. Further, if the size is smaller than 0.3 micron, the particles are liable to infiltrate between paper fibers to lose the color-developing function; hence such smaller sizes yield no advantage. Thus, the particle size of the developer is preferably in the range of 0.3 to 5 microns, more preferably 0.6 to 3 microns. Adjustment of the particle size of the developer to a preferred one is an important point in the practice of the present invention and also contains various technical contents.

Further, the relationship between the particle form of the developer and the properties of the aqueous dispersion has already been described, and since an object of the present invention is to provide an aqueous dispersion of a developer which has a high concentration and also has superior handling performance and storage stability over a long term, most of the particles are preferred to be right spherical particles, but if non-spherical particles are coexistent therewith to such an extent that the fluidity is not reduced, the dispersion becomes thixotropic so that settling of particles having larger particles present in admixture is prevented. As to the method of discriminating right spherical particles from non-spherical particles, observation by means of a microscope is considered to be optimum. The proportion of the right spherical particles is expressed in terms of the number thereof as observed by means of a microscope. However, since the image under a microscope is planar, the proportion of the right spherical particles is counted more than the practical one, but this cannot be helped. When the proportion of right spherical particles in an aqueous dispersion wherein the right spherical particles and the non-spherical particles are present in admixture exceeds 50%, the fluidity of the aqueous dispersion begins to be good. If the softening point of the developer particles is lower than the temperature of the aqueous dispersion, the non-spherical particles are converted into the right spherical particles or particles fuse with one another and solidify; hence the non-spherical particles cannot be present. However, if the temperature of the aqueous dispersion is lower by about 10° C. or higher, than the softening point of the developer, the non-spherical particles are stably present over a long term and has properties of making the dispersion thixotropic.

When the right spherical particles and the non-spherical particles are present in a suitable proportion, the resulting aqueous dispersion is abundant in the fluidity and yet somewhat thixotropic; hence settling of particles of larger particle diameter present in admixture is obstructed so that the dispersion endures a long term storage. The proportion of the right spherical particles preferred for the object of the present invention is preferably 50% or more of the total particles, more preferably in the range of 70 to 99.5%.

One of the processes for adjusting the proportion of the right spherical particles is to admix a dispersion of the right spherical particles and that of the non-spherical particles prepared separately. Another process is to further finely grind a prepared aqueous dispersion of the right spherical particles by means of sand grinder or the like at a temperature lower by 20° C. or higher, than the softening point of the particles. This process is particularly preferred in the case where coarse particles are present in admixture with the right spherical particles, that is, the coarse particles are preferentially finely divided to make the particle size distribution narrower so that the process also has an advantage of yielding a more desirable developer.

The size and form of the developer particles are most specific features of the present invention. Thus, the process for adjusting them will be described in more detail. For example, a developer consisting of zinc 3,5-di(α-methylbenzyl)salicylate which has currently been most broadly practically used has a softening point of about 120° C. in dried state thereof and also a softening point of about 70° C. when it has an equilibrium moisture in water. When this developer is finely ground by means of a sand grinder in water at 25° C., the resulting particles have an average particle diameter of about 2 microns as the limited fineness, and when finely ground at 5° C., the particles have that of about 0.8 micron as the limited fineness. And all of these particles consist of non-spherical particles. The adjustment of the particle size of the non-spherical particles is carried out by choice of conditions such as (1) grinding temperature, (2) kind of grinding media, (3) grinding time, etc. As to the particle size of the right spherical particles, it is possible to adjust the average particle diameter thereof within a broader range than that in the case of the non-spherical particles.

The factors which have influence upon the particle size in the preparation of the right spherical particles are (1) temperature at which the particles are dispersed, (2) proportion of dispersing medium to disperse phase, (3) kind of dispersing agent, (4) quantity of dispersing agent, (5) kind of dispersing media, (6) dispersing time, (7) kind of solvent at the time of dispersing. (8) quantity of solvent, etc. By adjusting these factors, it is possible to adjust the average particle diameter within a range of 0.3 to 5 microns. However, the thus adjusted right spherical particles generally have a drawback that the particle size distribution of the particles is somewhat broader than that of the non-spherical particles described above. However, it is possible to overcome this drawback by further treating the aqueous dispersion containing the right spherical particles with grinding media, as already described.

The concentration of the developer in the aqueous dispersion of the present invention is usually a high concentration of 10% or higher, and the preferred upper limit is 55%. In the case of such a high concentration, the transportation cost is not only reduced, but also it is possible to prepare a high concentration coating solution, and also it is possible to expect increase in the drying efficiency at the coating process and an effect of quality improvement upon the resulting developed sheet.

The dispersing agent used in the present invention includes anionic surfactants and nonionic surfactants, while cationic surfactants generally afford no good result. Examples of anionic surfactants are alkali salts of alkylsulfuric acid esters, alkali salts of alkylbenzenesulfonic acids, alkali salts of alkylnaphthalenesulfonic acids, alkali salts of oleic acid amide sulfonic acid, alkali salts of dialkylsulfosuccinic acids, alkali salts of sulfosuccinic acid esters, alkali salts of polystyrene-polysulfonic acid, alkali salts of lignin sulfonic acid, alkali salts of alkylphenol sulfonic acids, alkali salts of alkylsalicylic acids, alkali salts of aralkylsalicylic acids, alkali salts of polyacrylic acid, etc.

As the nonionic surfactants, high-molecular surfactants having a molecular weight of 400 or more are particularly preferred and examples thereof are polyvinyl alcohol, modified polyvinyl alcohols, polyacrylamide, modified polyacrylamides, etc. "modified" referred to herein means that base polymers have heterogeneous structural units contained at the end or intermediate part of the polymers according to telomerization or copolymerization. Further, by using anionic surfactants together with nonionic surfactants, an aqueous dispersion of the developer having a superior storage stability is obtained.

In the present invention in another aspect, a preferred process resides in that among the above-illustrated dispersing agents, polyvinyl alcohol is particularly chosen and a specified polyvinyl alcohol having a polymerization degree of 500 or more and a saponification degree of 70% or more is used as a dispersing agent.

By choosing and using such a specified polyvinyl alcohol, it is possible to easily produce such an aqueous dispersion of the developer that emulsification of the developer in water is easier; there occurs neither increase in the particle diameter of emulsified particles nor formation of resin mass, brought about when an organic solvent is removed from the resulting dispersion in the process of using the organic solvent; and the resulting suspension has a notably improved storage stability. Further, a developing sheet obtained by making up the aqueous dispersion of the developer prepared above into a coating solution of the developer for pressure-sensitive recording sheet, and applying it onto a suitable substrate such as paper, film, etc. and impregnating thereinto, exhibits such improved effects as superior color-developing properties to those in the case of other dispersing agents, a good printability e.g. surface strength, light-resistance, etc.

In the case of the polyvinyl alcohol used in the process of the present invention, if the polymerization degree is less than 500, the emulsifiability of the resulting developer is insufficient so that it is impossible to obtain an aqueous emulsion of the developer having an improved storage stability. Thus, a polyvinyl alcohol having a polymerization degree of 500 or more, preferably 1,000 or more is used. However, if the polymerization degree exceeds 5,000, the viscosity of the resulting aqueous solution of polyvinyl alcohol is so high that its handling becomes difficult; hence it is preferred to restrict the polymerization degree to about 5,000 or less. Further, a polyvinyl alcohol having a saponification degree less than 70% is insufficient in the emulsifiability; hence a polyvinyl alcohol having a saponification degree of 70% or more, preferably 80% or more is used.

In addition, the polyvinyl alcohol referred to herein means saponified products of vinyl acetate polymer, vinyl acetate copolymers such as vinyl acetate-acrylamide copolymer, vinyl acetate-ethylene copolymer, vinyl acetate-acrylic acid copolymer, vinyl acetate-vinyl ether copolymer, etc., and condensates of the foregoing with aldehydes or ketones, and among them, those which are water-soluble or water-dispersible are used.

The quantity of polyvinyl alcohol used is suitably adjusted depending on the size of the objective dispersed particles, etc., and the quantity is adjusted so as to give preferably a proportion of about 1 to 30 parts by weight per 100 parts by weight of the developer. Further, it has been elucidated that when particularly an anionic surfactant is used as a dispensing agent together with polyvinyl alcohol, an aqueous dispersion having a more improved emulsifiability and also a more improved storage stability is obtained. Examples of anionic surfactants to be simultaneously used are low-molecular weight anionic surfactants such as alkali salts of alkylsulfuric acid esters, alkali salts of alkylbenzene sulfonic acids, alkali salts of oleic acid amide sulfonic acid, etc., anionic natural high-molecular substances such as gum arabic, sodium alginate, etc., anionic semi-synthetic high-molecular substances such as carboxymethyl cellulose, phosphorylated starch, sodium ligninsultonic acid, etc., alkali salts of anionic synthetic high-molecular substances such as acrylic acid polymer, vinylbenzenesulfonic acid polymer, acrylic acid methylmethacrylate copolymer, acrylic acid-acrylamide copolymer, ethylene-maleic anhydride copolymer, etc.

As to the proportion of these anionic surfactants to be simultaneously used, it is necessary to pay attention thereto. If these surfactants are blended in a large quantity, the color-developing properties and surface strength of the resulting developer sheet are reduced; hence it is preferred to adjust the proportion so as to give a quantity equal to or less than that of polyvinyl alcohol, preferably a range of about 2 to 50% by weight based on polyvinyl alcohol.

For the organic solvent used in the present invention, various properties are required such as a relative low solubility in water, a good solubility in the developer, a low boiling point, difficult susceptibility to chemical change during preparation of the dispersion, etc. Concrete examples thereof are benzene, toluene, xylene, chloroform, carbon tetrachloride, trichloroethane, trichloroethylene, chlorobenzene, methyl ethyl ketone, methyl isobutyl ketone, ethyl acetate, butyl acetate, butanol, amyl alcohol, methyl-t-butyl ether, etc. The quantities of the dispersing agent and the organic solvent used vary depending on the objective size of dispersed particles, but the respective preferred ranges are 0.1 to 15 parts by weight of the dispersing agent and 0 to 500 parts by weight of the organic solvent each based on 100 parts by weight of the developer.

The present invention will be described in more detail by way of Examples.

EXAMPLE 1

Zinc 3,5-di(α-methylbenzyl)salicylate (softening point 72° C.) (2,000 g) and toluene (1,000 g) were mixed and dissolved at 60° C. to prepare a toluene solution. Separately, sodium laurylsulfate (10 g) and water (5,000 g) containing a copolymer (20 g) of acrylamide (93% by mol) with 2-phenoxyethyl acrylate (7% by mol) having an average molecular weight of about 2,500 were placed in a 10,000 ml capacity stainless steel beaker and heated to 60° C. While this mixture was agitated at 8,000 r.p.m. by means of a homomixer (manufactured by Tokushuki Kako Kogyo Kabushiki Kaisha, 200 watt), the toluene solution prepared above was added thereto over about 2 minutes, followed by further agitating and dispersing the mixture for about 20 minutes, transferring the resulting dispersion into a 10,000 ml capacity, hard glass, three-neck flask equipped with a stirrer, a thermometer and a distilling port, heating the flask while slowly rotating the stirrer to distil off toluene (1,000 g) and water (1,000 g) and obtain a dispersion containing almost no toluene, and cooling this dispersion to obtain an aqueous dispersion containing about 33% of the developer. The resulting dispersed particles had an average particle diameter of just one micron, but also contained coarse particles of 20 microns or larger (12 g). When the dispersion was sieved with a sieve having opening parts of 20 microns, an aqueous dispersion of the developer capable of being used as it was, was obtained. This aqueous dispersion was placed in a 500 ml graduated cylinder, followed by allowing it to stand still and thereafter examining settled particles. Almost no settled particle was observed. The dispersion was then allowed to stand still for 48 hours and observing the quantity of particles settled to give 2.2% based on the total solids content. The settled particles were again dispersed by agitating them.

EXAMPLE 2

The dispersion (5,000 g) obtained in Example 1 but prior to sieving was placed in a 10,000 ml capacity stainless steel beaker, followed by cooling it from the outside down to 5° C., and feeding the cooled dispersion into Coball Mill manufactured by Frima Maschinen Company, Swiss (7.5 KW, 1,600 r.p.m.) at a rate of 300 ml per minute to subject it to grinding treatment. For the treatment, only one pass through the Coball Mill was sufficient, and the resulting dispersion is used as it is, as developer, as in the case of Example 1. The dispersion was allowed to stand still for 48 hours, followed by measuring the quantity of particles settled, as in Example 1. No settled particle was observed. The proportion of right spherical particles observed under a microscope was 94%.

EXAMPLE 3

Water (6,000 g) containing powder (3.000 g) of a composition consisting of zinc 3,5-di(α-methylbenzyl)-salicylate (85% by weight) and zinc oleate (15% by weight) and having an average particle diameter of 90 microns and a softening point of 51° C., sodium dodecylbenzenesulfonate (30 g) and a copolymer of acrylamide (95% by mol) with 2-phenoxyethyl acrylate (5% by mol) having an average molecular weight of 3,500 (45 g) was fed into a 15,000 ml capacity stainless steel autoclave equipped with a magnetic type driving means obtained by reconstructing the homomixer of Example 1 for air seal, followed by heating the autoclave while rotating the means at a r.p.m. of 8,000, raising the temperature of the contents up to 150° C., the inner pressure at that time being about 3.5 $Kg/cm^2$, further dispersing the contents by the means at 150° C. for 30 minutes, thereafter reducing the r.p.m. from 8,000 down to 2,000, rapidly cooling the autoclave, opening the autoclave when the temperature of the contents reached 30° C. or lower and taking out the contents. The contents contained only right spherical particles having an average particle diameter of 1.3 micron and the quantity of coarse particles which did not pass through a sieve of 20 microns was only 2.4 g. The aqueous dispersion having removed the coarse particles are used as they are, as in the case of Example 1. Further, the quantity of particles settled after 48 hours were measured in the same manner as in Example 1 to give 4.9%.

EXAMPLE 4

The dispersion obtained in Example 3 but prior to sieving was treated in all the same as in Example 2. As a result, a dispersion having no settled particle even after 48 hours was obtained. The dispersion contained 93% of right spherical particles.

EXAMPLE 5

Zinc 3-(α-methylbenzyl)-5-(α,α-dimethylbenzyl)salicylate (1,600 g), a copolymer of styrene (60% by mol) with α-methylstyrene (40% by mol) having an average molecular weight of 1,200 (400 g) and xylene (1,000 g) were mixed and dissolved at 75° C., followed by dispersing the solution in water containing sodium laurylsulfate (10 g) and a copolymer of acrylamide (95% by mol) with 2-ethylhexyl acrylate (5% by mol) having an average molecular weight of about 4,000 (30 g) over 30 minutes while rotating a homomixer at a r.p.m. of 8,000, transferring the resulting dispersion into a 10,000 ml capacity hard glass flask equipped with a stirrer, a thermometer and a distilling port and heating the flask with slow stirring to azeotropically distill off xylene and water. When xylene (1,000 g) and water (1,200 g) were distilled off, almost no xylene remained in the flask. The residue was cooled down to 10° C., followed by adding powder (500 g) of a mixture of zinc 3-(α-methylbenzyl)-5-(α,α-dimethylbenzyl)salicylate (80% by weight) with the above-mentioned styrene-α-methylstyrene copolymer (20% by weight) having an average particle diameter of about 100 microns, again dispersing the mixture by a homomixer at a r.p.m. of 8,000 over 10 minutes and treating the resulting dispersion by means of Coball Mill having a jacket in which brine at 0° C. was circulated, at a rate of 300 ml per minute. The resulting aqueous dispersion had a fluidity but were thixotropic. The particles had an average particle diameter of 1.2 micron; the proportion of right spherical particles was 90%; the size of right spherical particles was mostly about 1 micron; and the size of non-spherical particles was mostly about 2 to 3 microns. The softening point of the developer was 79° C. Even when the aqueous dispersion was allowed to stand still for 48 hours, no settled substance was observed. Thus it is used as it is, for pressure-sensitive recording sheet.

EXAMPLE 6

Zinc 3,5-di(α-methylbenzyl)salicylate (1,700 g), 2,4,6-tri(α-methylbenzyl)phenol (300 g) and toluene (1,000 g) were treated in all the same manner as in Example 1 and Example 2 to obtain an aqueous dispersion of a developer having a good fluidity, the developer having a softening point of 54° C., the average particle diameter being 1.1 micron and the proportion of right spherical particles being 98%.

EXAMPLE 7

Zinc 3,5-di(α-methylbenzyl)salicylate (1,600 g), nickel 3-nonyl-5-phenylsalicylate (400 g) and toluene (1,000 g) were treated in the same manner as in Example 1 and Example 2 to obtain an aqueous dispersion of a developer, the softening point of the developer being 61° C., the average particle diameter being 0.8 micron and the proportion of right spherical particles being 97%. This aqueous dispersion of a developer was superior in the fluidity, settling stability and storage stability.

EXAMPLE 8

Powder (2,000 g) of a mixture of zinc 3,5-di(α-methylbenzyl)salicylate (80 parts by weight) with 2,4,6-tri(α-methylbenzyl)phenol (20 parts by weight) was dispersed in water containing sodium laurylsulfate (20 g) and a copolymer of acrylamide (93% by mol) with 2-phenoxyethyl acrylate (7% by mol) (an average molecular weight: 4,800) (40 g), followed by feeding the resulting dispersion to Coball Mill equipped with a jacket in which hot water at 80° C. was circulated, at a rate of 300 ml per minute and treating it therein, discharging the resulting dispersion at 92° C. and cooling it to obtain an aqueous dispersion of a developer having a good fluidity, the softening point of the developer being 47° C., the average particle diameter being 1.4 micron and the proportion of right spherical particles being 100%.

EXAMPLE 9

Zinc 3,5-di(α-methylbenzyl)salicylate (softening point 72° C.) (100 g) and toluene (100 g) were mixed and dissolved at 70° C. Separately, water (300 g) containing polyvinyl alcohol (polymerization degree 1,700; saponification degree 98%) (6 g) was placed in a 500 ml capacity stainless steel beaker, and while it was agitated by means of T.K. homomixer (trademark, manufactured by Tokushuki Kako Kabushiki Kaisha) at a r.p.m. of 3,000, the above-mentioned toluene solution was added thereto, followed by raising the r.p.m. up to 10,000 at the time of completion of the addition, agitating the mixture for 2 minutes, transferring the resulting dispersion into a 500 ml hard glass three-neck flask equipped with a stirrer, a thermometer and a distilling port, and heating the flask while slowly rotating the stirrer to distill off toluene and water from the distilling port. After this operation was continued at 100° C. for one hour, the dispersion contained almost no toluene. When it was cooled, the resulting dispersion contained about 33% of a developer. The average particle diameter of dispersed particles was 1.0 micron. This dispersion was placed in a 500 ml graduated cylinder and allowed to stand still for 48 hours and settled particles were then examined. Almost no settled particle was observed.

EXAMPLE 10

Powder of zinc 3,5-di(α-methylbenzyl)salicylate (softening point 72° C.) (100 g) and water (200 g) containing a polyvinyl alcohol (polymerization degree 1,000; saponification degree 88%) (10 g) were fed into a 1,000 ml capacity stainless steel autoclave equipped with a means obtained by reconstructing the homomixer of Example 9 so as to effect air seal, followed by heating the autoclave while rotating the reconstructed homomixer at a r.p.m. of 3,000, then raising the temperature of the contents up to 160° C., raising the r.p.m. up to 13,000, agitating the contents for 5 minutes, reducing the r.p.m. down to 3,000, rapidly cooling the autoclave, opening the autoclave when the temperature reached 30° C. or lower and taking out the contents. The contents contained only right spherical particles having an average particle diameter of 1.2 micron. Further, the contents were allowed to stand still for 48 hours and settled particles were examined, as in Example 9. Almost no settled particle was observed.

EXAMPLES 11-17 AND COMPARATIVE EXAMPLES 1-7

Example 9 was repeated except that the polyvinyl alcohol used as a dispersing agent was replaced by polyvinyl alcohols having polymerization degrees and saponification degrees as indicated in Table 1 or various dispersing agents or surfactants, to prepare 14 kinds of aqueous dispersions of developer. In addition, in Example 16, an anionic surfactant (sodium laurylsulfate) (0.6 g) together with polyvinyl alcohol (6 g) were added into water. The emulsifiability, emulsion stability and desolvation stability of the respective dispersing agents were evaluated as described below. The results are shown in Table 1.

EXAMPLE 18

Example 9 was repeated except that zinc 3,5-di(α-methylbenzyl)salicylate (100 g) and toluene (100 g) were replaced by zinc 3,5-di-tert-butylsalicylate (50 g), toluene (40 g) and 1-butanol (40 g), to prepare an aqueous dispersion of developer. The results are shown in Table 1.

(Emulsifiability)

This was expressed in terms of the average particle diameter (μm) of emulsified particles. The smaller the particle diameter, the more excellent the emulsifiability.

(Emulsion stability)

Emulsion was allowed to stand for 48 hours and the stability was judged according to the following standards:

A—The particle diameter of emulsified particles is unchanged.
B—Coarse particles gradually increase.
C—Oil droplets come to float on the surface of the emulsion.

(Desolvation stability)

This was judged from the state of the aqueous dispersion obtained after removing toluene on heating according to the following evaluation standards:

A—No occurrence of coarse particles.
B—Coarse particles of about 5 μm are observed.
C—Coarse particles of 20 μm or larger are observed.
D—Resin mass is formed.

In addition, in Comparative examples 5 and 6, emulsion stability of the toluene solution of developer in water was inferior; coarse particles were formed in the resulting emulsion; and a large quantity of resin mass was formed in the aqueous dispersion of developer obtained by removing toluene on heating. Thus, it was impossible for the dispersion as it was to carry out the subsequent quality confirmation test. Further, in Comparative example 7, the emulsion stability of the toluene solution of developer in water was extremely inferior so that emulsion preparation was impossible.

(Quality confirmation test)

Using 13 kinds of aqueous dispersions of developer obtained in Examples and Comparative examples, developer-coating solutions for pressure-sensitive recording sheet consisting of the following composition were prepared:

| | |
|---|---|
| Aqueous dispersion of developer (concentration: 33%) | 30 parts by weight |
| Precipitated calcium carbonate | 100 parts by weight |
| Sodium polyacrylate (concentration: 20%) | 5 parts by weight |
| Oxidized starch (concentration: 10%) | 50 parts by weight |
| Styrene-butadiene latex (concentration: 50%) | 40 parts by weight |
| Water | 230 parts by weight |

The resulting developer-coating solutions each were coated onto a wood free paper so as to give a dry coated quantity of 6.0 g/m$^2$ and dried to prepare 13 kinds of developer sheets, followed by subjecting these sheets to quality confirmation test. The results are shown in Table 1.

(Color-developing properties)

Pressure-sensitive recording sheet manufactured by Kanzaki Paper Manufacturing Company (top paper) and the above-mentioned respective developer sheets were faced to each other, followed by applying a pressure of 600 $Kg/cm^2$ for one minute, allowing the developed image to stand for 24 hours and thereafter measuring its concentration by means of a reflection densitometer (RD114 type, manufactured by McBeth Company). The higher the numeral value, the better the color-developing properties.

(Adhesive properties)

The respective developer sheets each were printed by means of a printing machine (RI II type, manufactured by Akira Seisakusho Company) and the surface strength was subjected to relative evaluation.

A—good; B—somewhat inferior;

C—no commercial value.

TABLE 1

| | Dispersing agent | | | Evaluation of dispersing agent | | | Quality evaluation | |
|---|---|---|---|---|---|---|---|---|
| | Kind | Polymerization degree | Saponification degree | Emulsifiability | Emulsion stability | Desolvation stability | Color-developing properties | Adhesive properties |
| Example | | | | | | | | |
| 9 | Polyvinyl alcohol | 1,700 | 98 | 1.0 | A | A | 0.72 | A |
| 10 | Polyvinyl alcohol | 1,000 | 88 | 1.2 | A | A | 0.71 | A |
| 11 | Polyvinyl alcohol | 1,000 | 98 | 1.0 | A | A | 0.72 | A |
| 12 | Polyvinyl alcohol | 500 | 98 | 1.5 | A | B | 0.75 | B |
| 13 | Polyvinyl alcohol | 2,400 | 98 | 1.0 | A | A | 0.68 | A |
| 14 | Polyvinyl alcohol | 3,500 | 88 | 1.0 | A | A | 0.69 | A |
| 15 | Polyvinyl alcohol | 2,000 | 80 | 1.3 | A | B | 0.70 | A |
| 16 | Polyvinyl alcohol | 500 | 98 | 1.5 | A | A | 0.74 | B |
| | Sodium laurylsulfate | — | — | | | | | |
| 17 | Saponified product of vinyl acetate-crylamide copolymer | 1,000 | 88 | 1.5 | A | A | 0.72 | B |
| 18 | Polyvinyl alcohol | 1,700 | 98 | 1.4 | A | A | 0.65 | A |
| Compar. ex. | | | | | | | | |
| 1 | Polyvinyl alcohol | 200 | 88 | 2.3 | B | C | 0.60 | C |
| 2 | Polyacrylamide | 2,000 | — | 1.7 | A | A | 0.58 | C |
| 3 | Gum arabic | — | — | 3.5 | A | C | 0.52 | C |
| 4 | Methyl cellulose | — | — | 6.8 | A | C | 0.49 | C |
| 5 | Sodium salt of ethylene-maleic anhydride copolymer | 1,200 | — | 1.7 | B | D | — | — |
| 6 | Sodium polystyrene-sulfonate | 2,800 | — | 2.0 | B | D | — | — |
| 7 | Nonionic surfactant (Emulsion 123P made by Kao Soap Co.) | — | — | 8.0 | C | — | — | — |

As to the aqueous dispersion of developer according to the above-described Examples, it is unnecessary to further process the dispersion into particles, but the dispersion is applicable, as it is, to pressure-sensitive recording sheet. Further, the aqueous dispersion easily flows at low viscosity in spite of its high concentration and is unchanged for a long term; hence it is superior in the handling properties and long term storage. This fact means commercially that the developer can be supplied and distributed in the form of an aqueous solution thereof. Whereas, since developers have so far been supplied in the form of dry powder, various problems have been raised in the aspect of its handling properties. According to the process of the present invention, no powder dust occurs, handling labor is reduced and reprocessing of particles is unnecessary as compared with conventional processes. Thus the hygienic and economical effectiveness of the process is evident.

Further, according to the process of the present invention, as apparent from the results of Table 1, any of the aqueous dispersions of developer obtained in Examples are superior in the handling performance and storage stability, and also developer sheets produced using the dispersions are superior in the color-developing properties and printability and very high in the commodity value.

What we claim is:

1. An aqueous dispersion of a developer for pressure-sensitive recording sheet, which developer is composed mainly of a salt of substituted salicylic acid expressed by the formula (I)

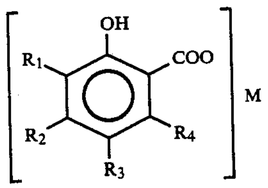

(I)

wherein $R_1$, $R_2$, $R_3$, and $R_4$ maybe the same or different and each represents hydrogen atom, halogen atom, alkyl group of 1 to 9 carbon atoms, alkylene group, cycloalkyl group, cycloalkylane group, phenyl group, nucleus-substituted phenyl group, aralkyl group or nucleus-substituted aralkyl group; N represents an interger of one or more; and M represents magnesium, calcium, zinc, aluminum, iron, cobalt, nickle or a base ion of the foregoing, and which developer has a softening point of 30° C. or higher and is dispersed in water, said developer having an average particle size of 0.3μ to 5μ, the proportion of right spherical particles in the total particles of the developer being 50% or more, and said developer dispersion being obtained by emulsifying-dispersing a developer composed mainly of a salt of substituted salicylic acid expressed by the formula (I) in an aqueous solution of a polyvinyl alcohol having a polymerization degree of 500 or more and a saponification degree of 70% or more at a temperature higher by at least 30° C. than the softening temperature of said developer, followed by cooling the resulting aqueous dispersion.

2. An aqueous dispersion according to claim 1 wherein said compound expressed by the formula (I) is zinc 3,5-di(α-methylbenzyl)salicylate or its basic salt.

3. An aqueous dispersion according to claim 1 wherein said softening point is in the range of 35° to 85° C.

4. An aqueous dispersion according to claim 1 wherein the proportion of right spherical particles in the total particles of the developer is in the range of 70 to 99.5%.

5. An aqueous dispersion according to claim 1 wherein said developer is contained in the dispersion in a proportion by weight of 10 to 55%.

6. An aqueous dispersion according to claim 1 polyvinyl alcohol has a polymerization degree of 1,000 or more and a saponification degree of 80% or more.

7. An aqueous dispersion according to claim 1 wherein said polyvinyl alcohol is used in a range of 1 to 30 parts by weight based on 100 parts by weight of said developer.

8. An aqueous dispersion according to claim 1 wherein said aqueous solution of said polyvinyl alcohol contains an anionic surfactant in a proportion of a quantity equal to or less than that of said polyvinyl alcohol.

9. An aqueous dispersion of a developer for pressure-sensitive recording sheet, which developer is composed mainly of a salt of substituted salicylic acid expressed by the formula (I)

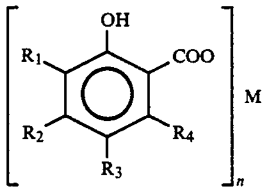
(I)

wherein $R_1$, $R_2$, $R_3$, $R_4$ and M are as defined above, and which developer has a softening point of 30° C. or higher and is dispersed in water, said developer having an average particle size of 0.3μ to 5μ, the proportion of right spherical particles in the total particles of the developer being 50% or more, and said developer dispersion being obtained by dissolving a developer composed mainly of a salt of substituted salicylic acid expressed by the formula (I) in an organic solvent, emulsifying-dispersing the resulting solution in an aqueous solution of a polyvinyl alcohol having a polymerization degree of 500 or more and a saponification degree of 70% or more on heating or without heating and successively distilling off said organic solvent from the resulting dispersion on heating.

10. An aqueous dispersion according to claim 9 wherein said compound expressed by the formula (I) is zinc 3,5-di(α-methylbenzyl)salicylate or its basic salt.

11. An aqueous dispersion according to claim 9 wherein said softening point is in the range of 35° to 85° C.

12. An aqueous dispersion according to claim 9 wherein the proportion of right spherical particles in the total particles of the developer is int he range of 70 to 99.5%.

13. An aqueous dispersion according to claim 9 wherein said developer is contained in the dispersion in a proportion by weight of 10 to 55%.

14. An aqueous dispersion according to claim 9 wherein said polyvinyl alcohol has a polymerization degree of 1,000 or more and a saponification degree of 80% or more.

15. An aqueous dispersion according to claim 9 wherein said polyvinyl alcohol is used in the range of 1 to 30 parts by weight based on 100 parts by weight of said developer.

16. An aqueous dispersion according to claim 9 wherein said aqueous solution of said polyvinyl alcohol contains an anionic surfactant in a proportion of a quantity equal to or less than that of said polyvinyl alcohol.

* * * * *

UNITED STATES PATENT AND TRADEMARK OFFICE
CERTIFICATE OF CORRECTION

PATENT NO. : 4,950,330

DATED : August 21, 1990

INVENTOR(S) : Toranosuke Saito, et al

It is certified that error appears in the above-identified patent and that said Letters Patent is hereby corrected as shown below:

Col. 14, line 20; outside the bracket of the formula (1) under the "M" insert -- n -- line 56; "cycloalkylane" should read -- cycloalkylene -- line 58; after the word "group;" insert -- adjacent two of $R_1$, $R_2$, $R_3$ and $R_4$ may form a ring in combination thereof; and in the case where one or more of $R_1$, $R_2$, $R_3$ and $R_4$ are alkylene group, nucleus-substituted aralkyl group or cycloalkylene group, two or more salicylic acid skeletons may be contained in one molecule; --

Signed and Sealed this

Twenty-third Day of March, 1993

*Attest:*

STEPHEN G. KUNIN

*Attesting Officer*

*Acting Commissioner of Patents and Trademarks*